United States Patent [19]
Ibach et al.

[11] Patent Number: 6,012,275
[45] Date of Patent: Jan. 11, 2000

[54] CUTTER ASSEMBLY FOR MOWING APPARATUS

[75] Inventors: Adolf Ibach, Remscheid, Germany; Robert L. Powers, Easton, Ill.

[73] Assignee: Carl Silberg GmbH & Co., Remscheid, Germany

[21] Appl. No.: 08/835,491

[22] Filed: Apr. 8, 1997

Related U.S. Application Data

[63] Continuation of application No. 08/486,077, Jun. 7, 1995, Pat. No. 5,617,712, which is a continuation-in-part of application No. 08/300,056, Sep. 2, 1994, abandoned.

[51] Int. Cl.[7] .................................................. A01D 34/17
[52] U.S. Cl. ................................. 56/298; 56/304; 56/307; 56/311
[58] Field of Search ........................... 56/298, 300, 304, 56/305, 306, 311, 307

[56] References Cited

U.S. PATENT DOCUMENTS

| 13,433 | 8/1855 | Morrison . | |
|---|---|---|---|
| 304,686 | 9/1884 | Allen | 56/304 |
| 379,881 | 3/1888 | Voss | 56/304 |
| 644,060 | 2/1900 | Cleveland | 56/305 X |
| 870,358 | 11/1907 | Griffiths | 56/305 |
| 1,945,301 | 1/1934 | Wilson . | |
| 2,024,309 | 12/1935 | Smith | 56/305 |
| 2,484,652 | 10/1949 | Schoenrock . | |
| 3,099,125 | 7/1963 | Turner | 56/298 X |
| 3,298,164 | 1/1967 | Salyards | 56/305 |
| 3,455,093 | 7/1969 | Stern | 56/305 |
| 3,514,932 | 6/1970 | Horowitz et al. . | |
| 3,722,196 | 3/1973 | Templeton | 56/298 |
| 4,387,554 | 6/1983 | Bedogni | 56/296 |
| 4,519,192 | 5/1985 | Oppenhuisen et al. | 56/298 |
| 4,553,380 | 11/1985 | O'Halloran | 56/298 X |
| 4,584,770 | 4/1986 | Sabol | 30/267 |
| 5,343,682 | 9/1994 | Puncochar | 56/305 |
| 5,487,259 | 1/1996 | Powers et al. | 56/298 |
| 5,617,712 | 4/1997 | Ibach et al. | 56/298 |

FOREIGN PATENT DOCUMENTS

| 2546367 | 11/1984 | France . |
|---|---|---|
| 1 507 170 | 12/1969 | Germany . |
| 1 816 316 | 7/1970 | Germany . |
| 2 343 491 | 3/1975 | Germany . |
| 1155464 | 6/1969 | United Kingdom . |

OTHER PUBLICATIONS

Einführung in die DIN–Normen, P. Böttcher, E. Fritzsche, H.–P. Grode, G. Kühl, R. Muschalla, K. Orth, W. Rauls, H.J. Sälzer, F. Zentner, 1985.

*Primary Examiner*—George A. Suchfield
*Attorney, Agent, or Firm*—Synnestvedt & Lechner LLP

[57] ABSTRACT

A cutter assembly for mowing apparatus comprises a sickle guard having individual guards which each consist of a guard body and an upper lip. The guard bodies are connected to a cutter bar via mounting pads. Each guard is provided with a rearward knife slot within which knife sections can move back and forth in a reciprocating manner. A hold-down member is provided to act against an upper face of a knife section, the hold-down member extending through the upper lip.

28 Claims, 2 Drawing Sheets

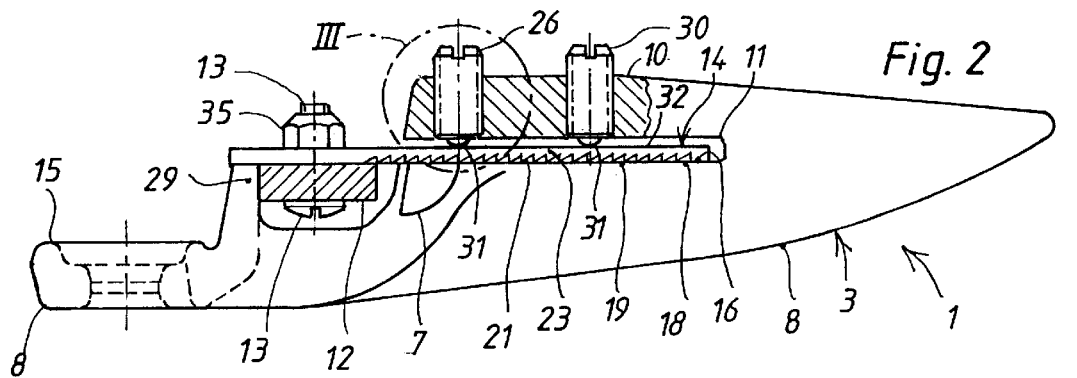
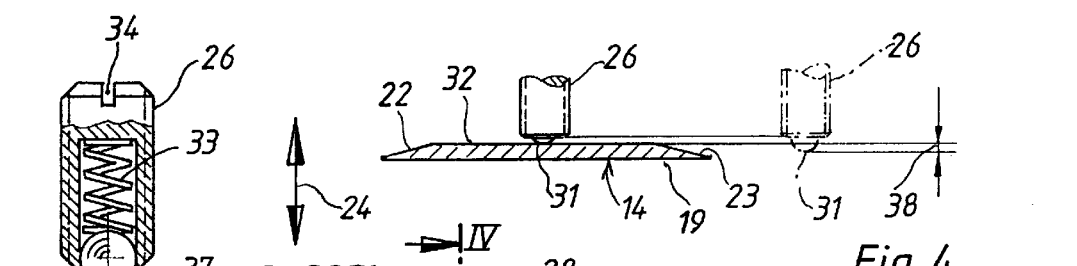
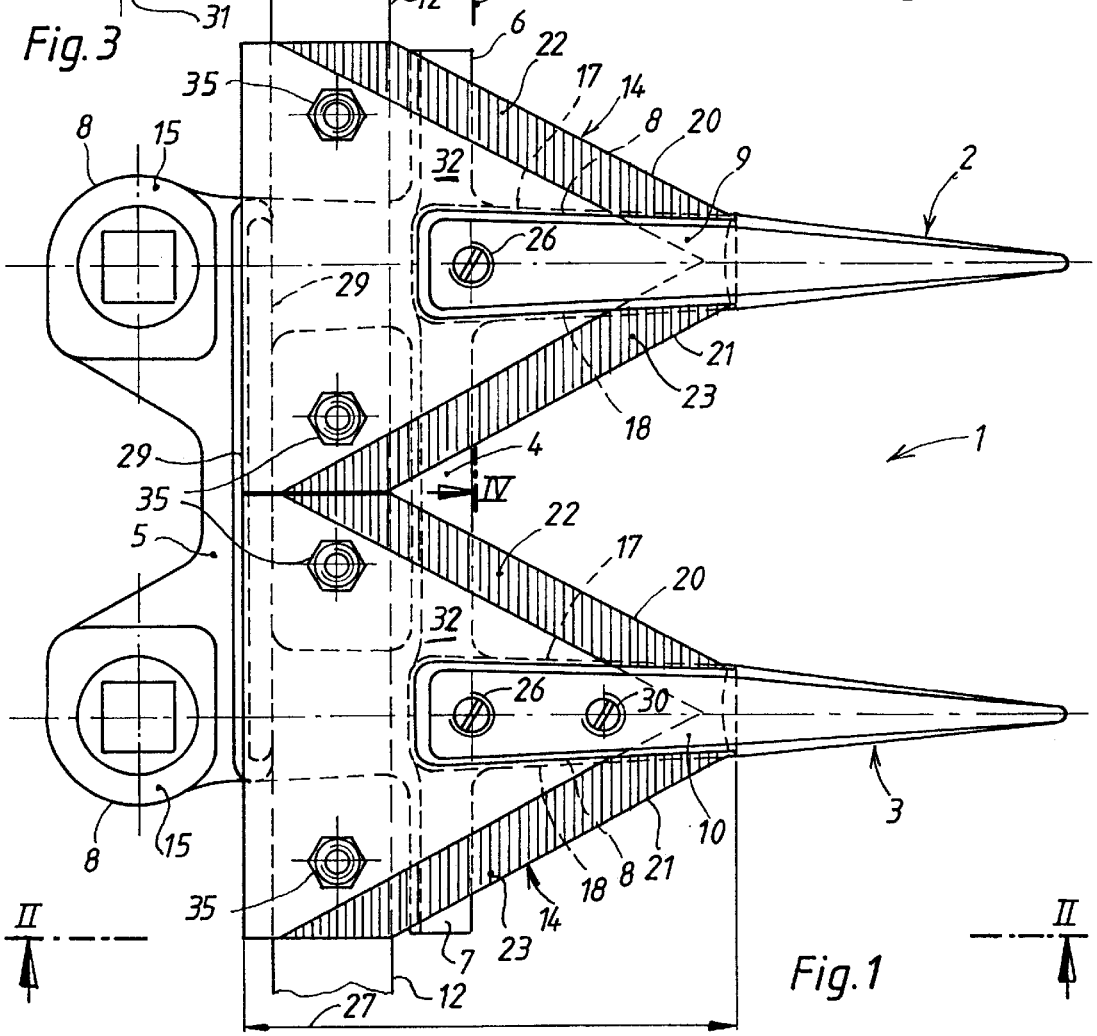

CUTTER ASSEMBLY FOR MOWING APPARATUS

CROSS-REFERENCE TO RELATED APPLICATIONS

This application is a continuation of application Ser. No. 08/486,077 filed Jun. 7, 1995, which will issue on Apr. 8, 1997 as U.S. Pat. No. 5,617,712, which is a continuation-in-part of application Ser. No. 08/300,056 filed Sep. 2, 1994 which is now abandoned. This application is also related to application Ser. No. 08/626,777 pending filed Apr. 2, 1996 by the same inventors.

BACKGROUND OF THE INVENTION

1. Field of the Invention

The invention relates to a cutter assembly for mowing apparatus. The invention is more particularly concerned with a sickle guard for a cutter assembly of mowers. The cutter assembly comprises a sickle guard having at least one guard, wherein each guard comprises a guard body and an upper lip secured to the guard body, wherein between the guard body and the upper lip is provided a knife slot to receive knife sections secured to a reciprocable knife back, wherein each guard body has a ledger surface facing the knife sections and with lateral cutting edges, wherein each knife section is provided with a bottom face and lateral facets defining knife section cutting edges, wherein each guard is releasably secured at least by its guard body to a cutter bar, and wherein hold-down means are provided for holding down the knife sections in the direction towards the ledger surface of the guard bodies.

2. Description of the Prior Art

In one known sickle guard of this type (GB-A-1155464) cast or forged hold-down clips are arranged at spaced intervals along a mounting member. Each clip is T-shaped in plan view and is fixed by means of two guard mounting screws to the cutter bar. A forwardly extending portion has an undersurface arranged to come into sliding contact with the upper faces of the knife sections. The clips and their assembly and possible adjustment perpendicular to the upper faces of the knife sections are costly and heavy.

From U.S. Pat. No. 3,722,196 it is known to divide each hold-down clip into a mounting flange and a hold-down arm which is linked thereto so as to be capable of being raised and lowered. By means of an adjustment screw inserted into the rearward end of the hold-down arm and engaging at against the cutter bar, there is a minimum distance between a lower guide face of the hold-down arm and the knife sections. This design requires increased expenditure.

From the French patent application 2546367 A1 it is known to adjust the height of the knife slot so that instead of an upper lip, one has a separate upper portion of the sickle guard which is able to be raised and lowered on a mounting screw. The upper portion has a fixed support runner behind the screw and an adjustable support screw in front of the screw. The supports and rest on a carrier plate which is supported on the cutter bar by means of a spacer plate. This design is associated with particularly high manufacturing and assembly costs.

SUMMARY OF THE PRESENT INVENTION

It is an object of the present invention to simplify and to improve the means whereby the knife sections are held down.

This object is achieved by the hold-down means comprising, at least for some of the upper lips, respectively at least one hold-down member which is movable into contact with a top face of the associated knife sections.

The holding down of the knife sections has the purpose of achieving and maintaining optimum cutting action between the knife section cutting edges and the cutting edges of the guards which cooperate therewith. If there is too great a distance between these cutting edges transversely to the stroke direction of the knife sections, then the growth and material to be cut will not be cut cleanly but rather will be squashed or knocked off. This can lead to damage of the mowing apparatus in use and to an increased requirement for drive energy. Furthermore, there is the danger that with unhindered upward movement of the knife sections in use, these knife sections could strike against the upper lips of the guards during their reciprocating stroke movement. This could lead to breakage of guards and to damage to the knife sections. The hold-down elements of the present invention can be used with advantage independently of the type of the particular guard and independently of the type of knife sections which are used. Thus, one can even use knife sections with serrated facets without any difficulty. By means of the hold-down elements of the present invention, special, bulky hold-down means fixed to the cutter bar are superfluous. The hold-down means of the present invention also mean that there is a considerable reduction in the weight carried by the cutter bar in total and ensures a better flow of crops.

Each hold-down element is preferably adjustable relative to its upper lip in the direction towards and away from the knife sections. This gives the advantage that the knife section cutting edges are always brought into the optimum position in relation to the corresponding cutting edges on the guards. As a rule, it is desirable that the undersides of the knife sections press with little force against the cutting surfaces of the guards. Subsequent adjustment can be carried out rapidly and accurately even during the mowing operation.

Preferably, each hold-down element has an external thread and the upper lips are provided with tap holes into which the hold-down elements are fitted. This results in a particularly simple and easy mounting of the hold-down elements in the upper lips. Also, eventual replacement of hold-down elements can be effected with little cost.

In one embodiment, each hold-down element comprises a ball member biased into contact with the upper face of the knife sections by spring means. This gives a functionally reliable and very low friction design for the hold-down elements. They can be formed, for example, as ball plungers. This type of hold-down element may further include stop means for limiting displacement of the ball member from the hold-down element. This reduces wear on the hold-down elements and on the knife sections.

In another embodiment, the hold-down element comprises a bolt-like member screwed into the threaded bore of the upper lip, to hold down the knife section.

On the respective upper lip there is preferably provided a hold-down element at least approximately in a plane extending through the centers of the length dimension of the knife sections measured transversely to the stroke direction of the knife sections. In this way, the hold-down elements are in contact with each knife section over a sufficient length. Moreover, this positioning is sufficiently far forward in order to counteract any upward movement of the knife sections in use.

In a preferred embodiment of the invention, a hold-down element is provided on the respective upper lip over a forward region of the knife sections. This has the advantage that the hold-down elements remain in contact with the knife sections with a comparatively short lever arm. This arrangement is recommended particularly as a supplementary fitting to the arrangement of hold-down elements as described in the preceding paragraph.

Additional objects, advantages and novel features of the invention will be set forth in part in the description which follows, and in part will become apparent to those skilled in the art upon examination of the following, or may be learned by practice of the invention.

BRIEF DESCRIPTION OF THE DRAWINGS

The foregoing summary, as well as the following detailed description, will be better understood when read in conjunction with the figures appended hereto. For the purpose of illustrating the invention, several embodiments are shown in the drawings. It is understood, however, that this invention is not limited to the precise arrangement and instrumentalities shown. In the drawings:

FIG. 1 is the plan view of a sickle guard formed as a double sickle guard and illustrating two different embodiments;

FIG. 2 is the sectional view taken along the line II—II in FIG. 1;

FIG. 3 is a view on an enlarged scale of the circled detail III in FIG. 2, partly in longitudinal section showing one embodiment of a hold-down element;

FIG. 4 is a partial sectional view taken along the line IV—IV in FIG. 1;

DESCRIPTION OF THE PREFERRED EMBODIMENT

Figure 5:
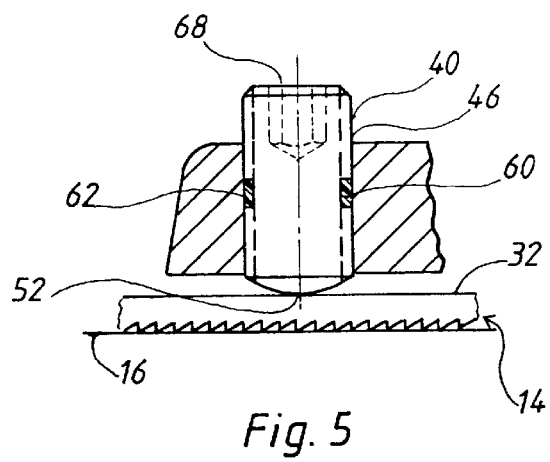
FIG. 5 is a sectional view of another embodiment of a hold-down element.

The sickle guard 1 shown in FIG. 1 comprises two guards 2 and 3 which are connected rigidly together to form a one-piece double sickle guard, at the front by an inner trash bar 4 and at the back by a connecting web 5. At the level of the inner trash bar 4 each guard 2, 3 carries on the outside an outer trash bar 6 and 7 respectively.

Each guard 2, 3 comprises a guard body 8 and an upper lip 9 and 10 fixed to the guard body 8 at a forward section of the guard body and extending rearward, the forward section being the right-hand side as shown in FIGS. 1 and 2. Between each guard body 8 and its upper lip 9, 10 there is a knife slot 11 (FIG. 2) to receive knife sections 14 which are secured to a reciprocable knife back 12 by special screws 13 and self-locking special nuts 35. The knife back 12 is supported at the rearward side by a wear bar 29 of the guard bodies 8.

Each guard body 8 is releasably securable via a mounting pad 15 and by means of guard mounting screws to a cutter bar of a mower in a known manner.

Each guard body 8 has a ledger surface 16 (FIG. 2) with lateral cutting edges 17 and 18 facing the knife sections 14. Each knife section 14 is provided with a bottom face 19 (FIG. 2) and, at the sides, with facets 22 and 23 defining knife section cutting edges 20 and 21. In this case the facets 22, 23 are serrated. The facets could, however, alternatively be ground smoothly onto the knife sections or could be formed in some other way known per se.

In FIG. 1 the knife sections secured to the knife back 12 are drivable back and forth in stroke directions 24 indicated by a double-headed arrow.

Hold-down means is provided for holding down the knife section 14 in the direction towards the ledger surface 16 of at least one of the guard bodies. The hold-down means comprises at least one hold-down element 26 associated with at least one of the upper lips and which is positioned above the knife section 14 to limit the upward movement of the knife section 14 relative to the ledger surface 16. The hold-down element 26 is movable into contact with the top face of the knife section. Preferably, the hold-down element 26 is adjustable relative to the associated upper lip 9, 10 in the direction towards and away from the knife sections 14. More preferably, the hold-down element 26 has an external thread for engaging a respective bore or tap hole in the upper lip in which the hold-down element is received.

FIG. 1 illustrates two examples of the guard 2,3. In one example (guard 2) a hold-down element 26 is screwed downwards from above, in a rearward tap hole of the upper lip 9 above the ledger surface 16 as shown in FIG. 2. In this particular example, a hold-down element in the form of a ball plunger 26, which is further described below, is shown. The hold-down element 26 is located at least approximately in a plane 28 which passes through the centers of the length dimension 27 of the knife sections 14 measured transversely to the stroke direction 24 of the knife sections 14.

In the other example (guard 3), the other upper lip 10 again has, towards the rearward end, a hold-down element 26 at the same position as in the case of the upper lip 9. However, the upper lip is provided over a forward region of the knife sections 14 with an additional hold-down element 30 which, again in this example, is in the form of another ball plunger.

Illustrated in FIGS. 2–4 is one preferred embodiment of the hold-down element 26, 30. FIG. 2 shows that for each hold-down element 26, 30 a ball 31 is pushed into contact with a top face 32 of the knife section 14. Each ball 31 is, as shown in FIG. 3, biased into contact with the top face 32 of the knife section 14 by a biasing member 33 located within the hold-down element 26 which is formed as a screw. The biasing member 33 comprises a compression spring in the illustrated embodiment. The magnitude of the biasing force can be adjusted by the introduction of a screwdriver into an upper screw slot 34 of each hold-down element 26, 30 and the particular hold-down element 26, 30 can then be rotated relative to the upper lip 9, 10.

FIG. 2 shows the design and arrangement of the special screws 13 and the special nuts 35 by which the knife sections 14 are secured to the knife back 12.

As shown in FIG. 3, the screw sleeve of the hold-down element 26 extends down below the horizontal diameter of the ball 31 to form an abutment edge and thus forms a stop 37 which limits the outward movement of the ball 31 from the hold-down element 26.

This limiting effect is illustrated in FIG. 4, where at the left-hand side in solid lines the ball 31 is shown in contact with the top face 32 of the knife section 14. In contrast, at the right-hand side of FIG. 4, in chain-dotted lines, the ball 31 is shown in the position which it adopts when the ball has overrun the facet 23 by a small amount and then has been prevented from further outward movement by the stop 37. This defines a pressure stroke 38 for the ball 31. This pressure stroke 38 can be kept comparatively small.

Figure 6:
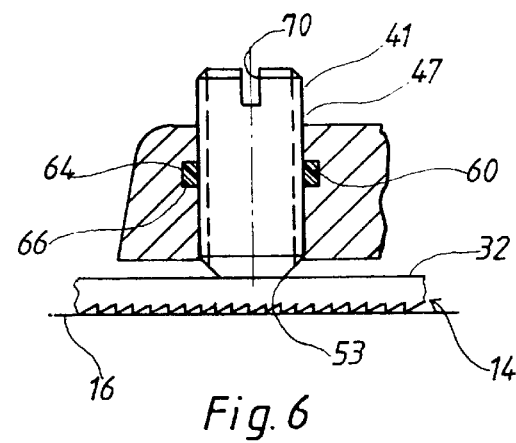
FIG. 6 is a sectional view of a further embodiment of a hold-down element.

Additional preferred embodiments of the hold-down element are illustrated in FIGS. 5–10. Each hold-down element 40, 41, 42, 43, 44, and 45 is shown as a solid bolt-like screw member 46, 47, 48, 49, 50, and 51, respectively, having an external thread adapted to be screwed into a threaded bore or tap hole of the upper lip 9, 10 from above in a similar manner as previously described for hold-down element 26, 30. FIGS. 5 and 6 show hold-down elements 40 and 41 in relation to upper lip 9 and knife section 14. Adjustment of the hold-down elements 40, 41, 42, 43, 44, and 45 to hold down knife section 14 is made by rotating the hold-down element to the desired position. Overtightening is avoided by placing a thin piece of material, preferably a very thin steel sheet, between the bottom (lower end) 52, 53, 54, 55, 56, 57, respectively, of the hold-down element 40, 41, 42, 43, 44, 45 and the top face 32 of the knife section 14. The sheet is then pulled out sideways and the system adjusted. The "play" between the bottom 52, 53, 54, 55, 56, 57 and knife section 14 should be minimal and the steel sheet correspondingly very thin.

Figure 10:
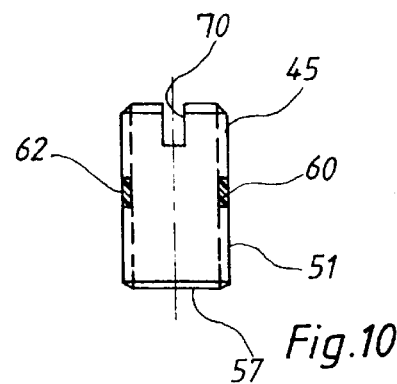
FIG. 10 is a side view of yet another embodiment of a hold-down element.

The hold-down elements 40, 41, 42, 43, 44, and 45 preferably have standard end configurations of threaded bolts such as the corresponding ones according to German Standard DIN 78, Einführung in die DIN-Normen, 1985, which is hereby incorporated by reference. FIG. 10 in particular represents a non-standard screw bolt whose lower end has simply been cut transversely to the longitudinal axis and the outer edge rounded a little bit. These bolt-like members preferably have a normal metrical ISO thread M 8×1, 25 mm, with an outer diameter of 8 mm and, preferably, a property class of 10.9 or 12.9 according to German Standard DIN ISO 898 T1, Einführung in die DIN-Normen, 1985, which is hereby incorporated by reference. These materials have good strength and wear-resistant properties. It is understood that the hold-down element is not limited to these property classes as any suitable property class can be used. For example, property classes 5.8, 6.8, 8.8, and 9.8 of DIN ISO 898 T1 is also known to be acceptable.

Each of the bolt-like members in FIGS. 5 to 10 is shown with a locking element 60 for preventing inadvertent loosening of the hold-down element once it has been set to its operative position as explained above. In FIGS. 5 and 7–10, the locking element 60 comprises a thin layer of material, preferably a synthetic adhesive-like material, that is applied to a ring-like area 62 of the thread of the bolt or the bore. Such locking elements are known in the art and allow removal of the bolt when necessary.

In FIG. 6 another locking element embodiment is shown. A groove 64 is provided in the wall of the bore and a ring 66 of locking material embedded therein. Ring 66 projects radially into the path of the bolt 47 just enough to create the desired amount of friction for the bolt to stay in place. Any type of suitable locking element, including any type of locking means as known in the art, may be used to lock the hold-down element in place and prevent inadvertent loosening.

Figure 7:
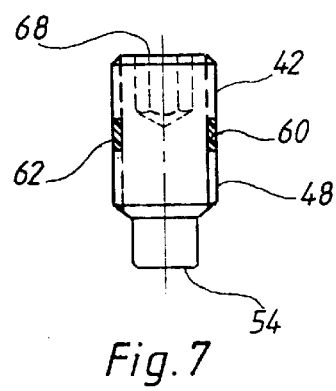
FIG. 7 is a side view of still another embodiment of a hold-down element.
Figure 8:
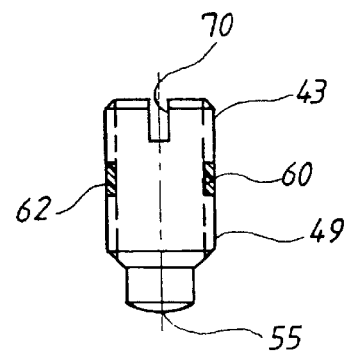
FIG. 8 is a side view of another embodiment of a hold-down element.
Figure 9:
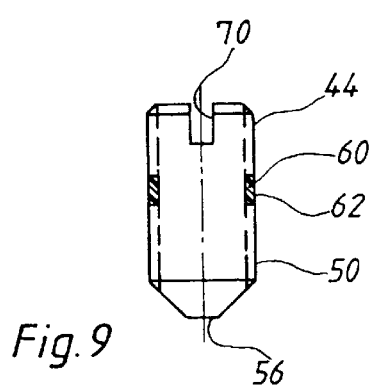
FIG. 9 is a side view of another embodiment of a hold-down element.

In FIGS. 5 and 7, the bolt-like member is shown as having a hexagon socket 68, whereas in FIGS. 6, 8, 9, and 10, a screw slot 70 is provided for turning the bolt member. Any means for rotating the hold-down member may be used.

It will be recognized by those skilled in the art that changes may be made to the above-described embodiments without departing from the broad scope of the invention. It is understood that this invention is not limited to the particular embodiments disclosed, but is intended to cover all modifications which are within the scope and spirit of the invention as defined by the appended claims.

We claim:

1. A guard combinable with a knife section to form a cutter assembly, said guard comprising:

a guard body and an upper lip fixed to a forward section of said guard body;

a knife slot positioned between said guard body and said upper lip for receiving the knife section;

a ledger surface formed on said guard body and having a cutting edge, wherein the knife section rests on said ledger surface when the knife section is received in said knife slot; and a hold down element extending downward from said upper lip, said hold down element positionable above the knife section to limit the upward movement of the knife section relative to the ledger surface.

2. A guard in accordance with claim 1 wherein said hold down element comprises a bolt-like member having a lower end.

3. A guard in accordance with claim 1 wherein said upper lip has a hole positioned above said ledger surface, said hold down element extending downward from said hole.

4. A guard in accordance with claim 1 further comprising a threaded hole positioned in said upper lip above said ledger surface, and wherein said hold down element comprises a threaded bolt-like member screwed into said threaded hole and having a lower end for limiting the vertical movement of the knife section.

5. A guard in accordance with claim 6 wherein said ledger surface is flat and includes two cutting edges positioned to cooperate with the knife section for cutting.

6. A guard in accordance with claim 1 wherein said hold down element is adjustable relative to said upper lip towards and away from said knife section.

7. A guard in accordance with claim 4 wherein said lower end of said bolt-like member is flat.

8. A guard in accordance with claim 4 wherein said bolt-like member has means for being rotated to adjust said hold down member.

9. A guard in accordance with claim 1 further comprising a locking element positioned to prevent inadvertent loosening of said hold down element.

10. A guard in accordance with claim 9 wherein said locking element includes a material positioned between said hold-down element and said upper lip to increase friction therebetween.

11. A guard in accordance with claim 1 wherein said hold down element comprises a biasing member positionable above the knife section to contact an upper face of the knife section and urge the knife section towards the ledger surface.

12. A guard in accordance with claim 1 wherein said hold down element is positioned above said ledger surface.

13. A guard in accordance with claim 8 wherein said means for rotating comprises a screw slot.

14. A guard in accordance with claim 4 wherein said bolt like member comprises a screw bolt.

15. A guard in accordance with claim 3 wherein said hold-down element is positionable above the knife section to contact a top face of the knife section when the knife section is received in said knife slot.

16. A guard in accordance with claim 3 wherein said hold-down element is positionable above the knife section so as to provide a minimum "play" between a top face of the knife section and the hold-down element.

17. A guard combinable with a knife section to form a cutter assembly for mowing, the guard comprising a guard body;

an upper lip secured to a forward section of said guard body and extending rearward, said upper lip being spaced from said guard body to form a knife slot for receiving a knife section;

a cutting edge positioned on said guard body to be beneath the knife section;

a hold-down element secured to and extending downwards from said upper lip and positionable to limit the upward movement of the knife section relative said cutting edge.

18. A guard in accordance with claim 17 wherein said hold down element has an external thread, and said upper lip has a threaded hole engaging said hold down element and from which said hold down element extends.

19. A guard in accordance with claim 18 wherein said hold down element comprises a bolt-like member having a lower end.

20. A guard in accordance with claim 19 wherein said bolt-like member is adjustable relative to said upper lip in the direction towards and away from the knife section.

21. A guard in accordance with claim 19 wherein said hold-down element is positionable above the knife section so as to provide a minimum "play" between a top face of the knife section and the hold-down element.

22. A guard in accordance with claim 20 further comprising a ledger surface formed on said guard body and positioned to contact a bottom face of the knife section, said ledger surface includes said cutting edge, and said hold down element being above said ledger surface.

23. A guard in accordance with claim 20 further comprising a locking material disposed to increase friction between said bolt-like member and said hole to prevent inadvertent loosening of said bolt-like member.

24. A guard in accordance with claim 23 wherein said locking material is disposed on said bolt like member.

25. A guard in accordance with claim 20 wherein said hold down element extends into said knife slot.

26. A guard in accordance with claim 17 wherein said hold down element has means for urging the knife section toward the ledger surface.

27. A cutter assembly comprising:

a guard body and an upper lip fixed to a forward section of said guard body;

a knife slot between said guard body and said upper lip;

a knife section disposed for reciprocating notion within said knife slot, said knife section having knife cutting edges and an upper face;

a ledger surface formed on said guard body and having cutting edges disposed to cooperate with said knife cutting edges for mowing; and a hold down element extending downward from said upper lip, said hold down element positionable above the upper face of the knife section to limit the upward movement of the knife section.

28. A cutter assembly in accordance with claim 27 wherein said hold down element comprises a bolt-like member.

* * * * *

UNITED STATES PATENT AND TRADEMARK OFFICE
CERTIFICATE OF CORRECTION

PATENT NO. : 6,012,275
DATED : January 11, 2000
INVENTOR(S) : Adolf Ibach & Robert L. Powers It is certified that error appears in the above-identified patent and that said Letters Patent are hereby corrected as shown below:

Cover sheet, under [73] Assignee: "Silburg" should be "Sülberg"
Col. 6, line 34, "claim 6" should be "claim 4";
Col. 8, line 18, "notion" should be "motion"

Signed and Sealed this

Eighth Day of May, 2001

Attest:

NICHOLAS P. GODICI

*Attesting Officer*     Acting Director of the United States Patent and Trademark Office